May 22, 1928.

A. JOHNSON

ELECTRIC WATER HEATER

Filed April 6, 1927

Inventor.
Axel Johnson
By Harry A Totten
attorney.

May 22, 1928.
A. JOHNSON
ELECTRIC WATER HEATER
Filed April 6, 1927
1,670,506
2 Sheets-Sheet 2
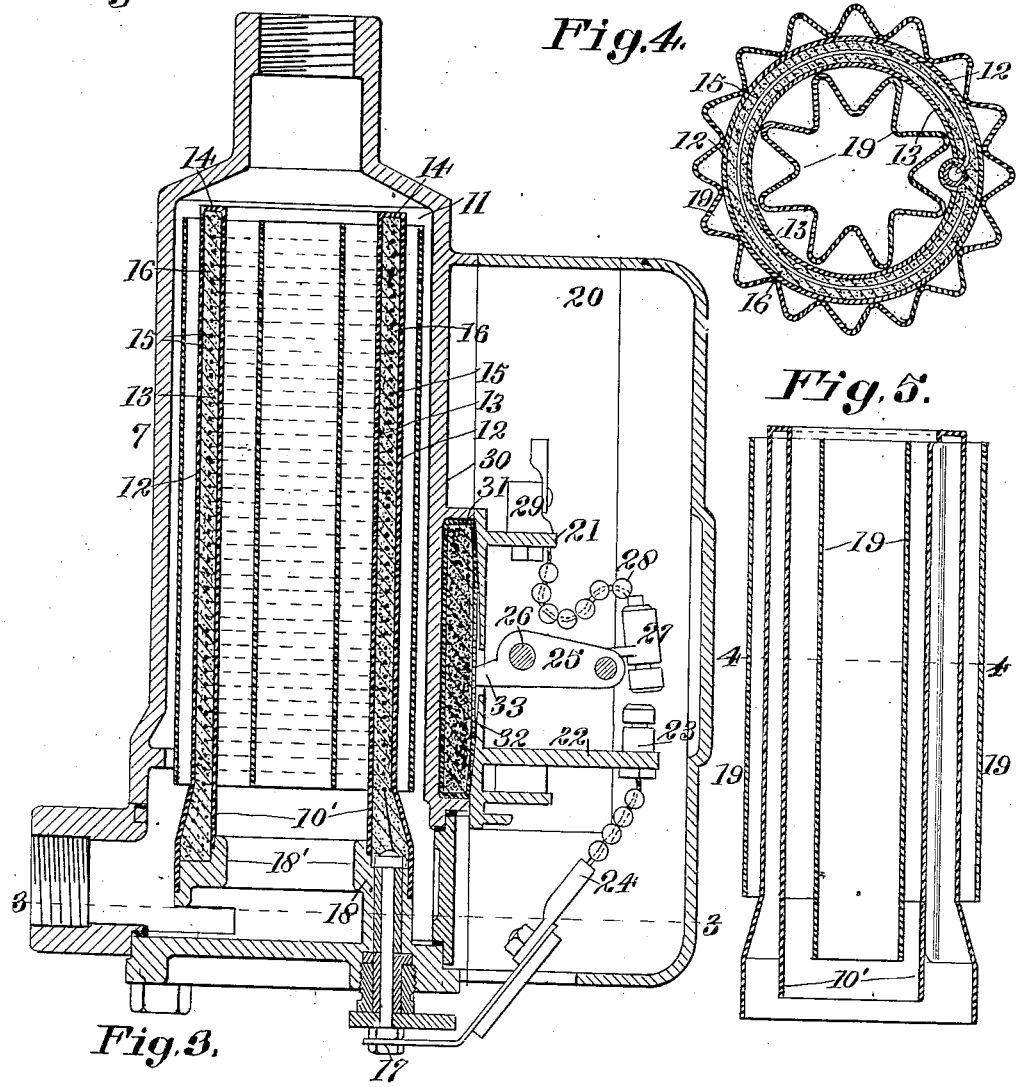
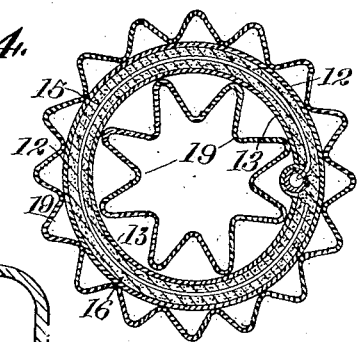
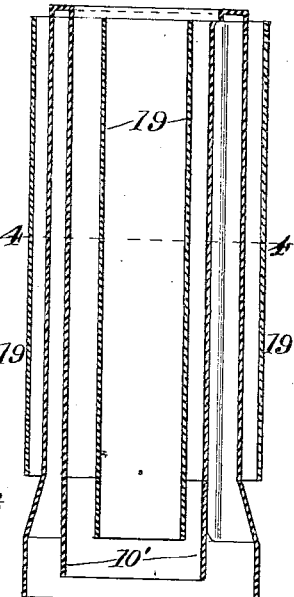
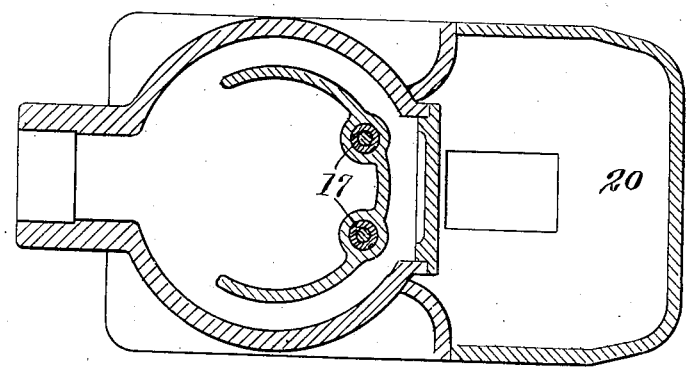

Patented May 22, 1928.

1,670,506

UNITED STATES PATENT OFFICE.

AXEL JOHNSON, OF OAKLAND, CALIFORNIA.

ELECTRIC WATER HEATER.

Application filed April 6, 1927. Serial No. 181,363.

The present invention relates to a storage capacity water heater and more particularly to one wherein a relatively small quantity of the total storage capacity may be maintained highly heated for use when desired, or by the operation of a valve the entire capacity of the heater may be maintained at a high temperature for use when desired.

The principal object of this invention is to provide a storage capacity heater wherein, by maintaining a relatively small quantity of the total capacity of the system highly heated, sufficient hot water for all ordinary purposes, approximately four gallons, is at all times available; to provide a system wherein the heating cost of the quantity of water necessary for ordinary purposes is reduced to a minimum, and wherein provisions are available for heating the entire capacity of the system, and, thereafter, maintaining only a portion thereof at a higher temperature than the remainder, making available the full capacity of the system at a relatively high temperature when the two quantities of variable temperature water are mixed, which may take place in withdrawing the same from the boiler. A further object is to provide a circulating system of storage capacity, wherein the heating of the water in the system is interrupted when the desired temperature of the quantity to be heated is attained.

The invention consists broadly in incorporating with an electric heating unit, the operation of which is automatically controlled by the water temperature passing therethrough, a boiler or storage capacity chamber having a water inlet discharging thereinto near its bottom and two water outlets, one leading therefrom at a point above its transverse center and near its top, and the other leading from its bottom, and valve controlled; the two outlets connecting with the heating chamber affording an inlet for the water supplied thereto, and a water outlet leading form the heating chamber and connected through a branch with the upper end of the boiler or water container, providing a circulating means between the heating chamber and boiler when no water is being withdrawn from the latter pipe.

The invention also consists in an improved type of heating member or element wherein the heating coil is protected from contact with the water and with which coil are associated heat conducting veins, with which the water in its flow through the heating chamber contacts and absorbs the heat delivered thereinto by conduction.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be restored to without departing from the spirit or sacrificing any of the advantages of the invention.

To more clearly comprehend the invention, reference is directed to the accompanying drawings, wherein—

Fig. 2 is a vertical central section though the heater.

Fig. 3 is a cross sectional view on line 3—3 Fig. 2.

Fig. 4 is a transverse, sectional view on line 4—4, Fig. 5.

Fig. 5 is a vertical sectional view through the heating element.

Figure 1:
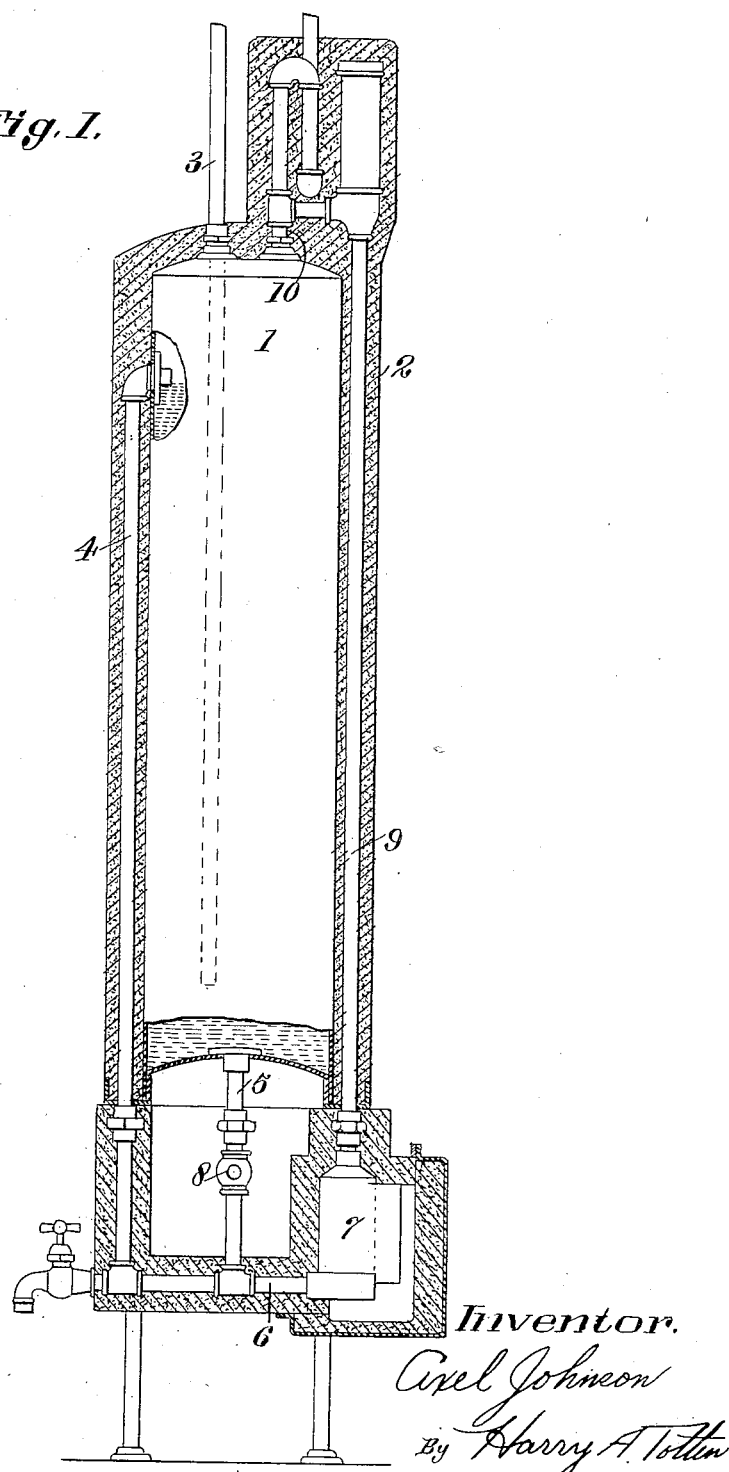
Fig. 1 is a view in vertical section through the boiler casing with the boiler partly in section and the heater in elevation.

Referring more particularly to the several views of the drawings, wherein like characters of reference designate corresponding parts— 1 indicates a boiler or closed chamber of conventional structure, preferably enclosed by a covering of heating insulation 2, such as asbestos. Water is supplied to the boiler through a pipe 3 entering its top and discharging thereinto near its bottom. From the boiler extend the outlet pipes 4 and 5, the former communicating with the interior of the boiler, above its transverse center line and at a point near its top wall and connecting at its discharge with the inlet 6 of a heater casing 7. The second outlet 5 leads from the bottom of the boiler, and connects with the outlet 4 at a point slightly in advance of its connection with the heater casing 7, there being a shut-off valve 8 mounted in the outlet 5, in advance of its point of connection with the outlet 4.

From the heater casing 7 extends an outlet pipe 9 from which laterally branches a pipe 10 connecting with the boiler at its top or upper end. This arrangement of connections between the heater casing and boiler admits, when the valve 8 is closed, of a water circulation from the top of the boiler through the pipe 4 to the heater casing 7 and therefrom through the pipe 9, returning to the upper portion of the boiler 1. This circulation insures a small quantity, approximately four gallons of water, to be maintained heated at the desired temperature at all times and in circulation through the boiler 1 and heater casing 7. This small quantity of highly heated water is capable of being withdrawn from the boiler when desired, through the branch pipe 10.

When it is desired to heat and have available for use the entire contents of the boiler, it is only necessary that valve 8 be opened, affording a circulation through the boiler from its bottom and through the heater casing 7, returning the water to the top of the boiler through branch pipe 10.

The preferred heating unit in this system comprises an open ended cylindrical shell 10', vertically positioned within a chamber 11 in the heater casing 7. Pipe 6 from boiler 1 discharges into the lower end of chamber 11 and pipe 9 connects with the upper end of chamber 11, thus with the chamber vertically disposed and the pipes connecting therewith, as described, a circulation therethrough is assured. The parallel spaced walls 12 and 13 connected at their upper ends by a top wall 14 provide a compartment for a heating element preferably comprising a resistance wire 15 coiled therein and imbedded within a refractory lining 16. Terminal members 17 extend from the opposite ends of the resistance coil through the bottom wall 18 of the heater casing 7.

Upwardly from the bottom wall 18 of the heater casing 7 extends a cored flange 18' to which are secured the lower ends of walls 12 and 13, the member 18' affording a seal for the lower end of the compartment formed therebetween. The mounting of the heating unit on the removable bottom wall 18 enables the detachment of the bottom wall from the heater casing 7 and the removal of the heating unit in one piece therefrom.

Inwardly from the wall 12 and outwardly from wall 13 extend veins 19 heated by conduction from the respective walls 12 and 13, and with the surface of these veins the water contacts in passing around the cylindrical shell and through the central opening therein. While the veins are illustrated as being formed by bending plates to provide relatively large bellow-like corrugations, it is to be understood that any suitable vein structure may be employed and by which the maximum area of plate surface to be heated by conduction from the chamber walls is afforded.

The heater casing 7 has formed on one side thereof a contact chamber 20 within which are brackets, forming respectively upper and lower terminal blocks 21 and 22. The lower terminal block 22 mounts a contact button 23, connected through lead 24 with the terminal 17. A switch lever 25 is pivotally mounted on shaft 26 between terminal blocks 21 and 22 and at its end carries a contact button 27 connected through lead 28 with binding post 29, from which extends an electrical connection, not shown.

In the wall 30 of the heater casing 7 is provided a chamber 31 within which is positioned a thermal switch operating cell 32 of a type adapted for expansion under heat and contraction under cold. With one surface of the cell 32 cooperates the extension 33 on the lever 25.

It will be observed that on the expansion of the operating cell 32, Fig. 2, contact 27 is separated from contact 23 and one lead of the circuit to the heating element is interrupted.

As the water circulating upwardly through the heating unit drops in temperature, the cell 32 through conduction through wall 30 contracts, releasing pressure from the inner end of the lever 25, permitting contact 27 to engage with contact 23 and complete the heating circuit.

It will thus be apparent that the circulation of the water upwardly through the heating unit actuates the thermostat or control device for making and breaking the electrical contact controlling the energizing of the heating unit.

I claim:—

1. In combination with a boiler provided with a water inlet discharging thereinto near its bottom, a pair of water outlets leading therefrom, one connecting with the boiler above its transverse center line and near its top and unobstructed to afford a water flow from the upper portion of the boiler at all times, and the other connecting with the boiler near its bottom, a valve in the latter outlet controlling the water flow therethrough, a heater casing with which both of said water outlets connect, a water outlet extending from the heater casing, a connection between said latter outlet and the boiler at its top, and a heating element within said heater casing.

2. In combination with a boiler provided with a water inlet discharging thereinto near its bottom, a pair of water outlets leading therefrom, one connecting with the boiler above its transverse center line and near its top and unobstructed to afford a water flow from the upper portion of the boiler at all times, and the other connecting with the boiler near its bottom, a valve in the latter outlet controlling the water flow therethrough, a heater casing with which both of said water outlets connect, a water outlet extending from the heater casing, a connection between said latter outlet and the boiler at its top, and a tubular electrically heated shell within the heater casing through and around which the water passing through said casing flows.

3. In combination with a boiler provided with a water inlet discharging thereinto near its bottom, a pair of water outlets leading therefrom, one connecting with the boiler above its transverse center line and near its top and unobstructed to afford a water flow from the upper portion of the boiler at all times, and the other connecting with the boiler near its bottom, a valve in the latter outlet controlling the water flow therethrough, a heater casing with which both of said water outlets connect, a water outlet extending from the heater casing, a connection between said latter outlet and the boiler at its top, and a tubular vertically disposed open ended shell within the heater casing, an electric heating unit sealed within said shell, and heat conducting veins radiating from said shell wall and with which the water passing through said casing contacts.

4. In combination with a boiler provided with a water inlet discharging thereinto near its bottom, a pair of water outlets leading therefrom, one connecting with the boiler above its transverse center line and near its top and unobstructed to afford a water flow from the upper portion of the boiler at all times, and the other connecting with the boiler near its bottom, a valve in the latter outlet controlling the water flow therethrough, a heater casing with which both of said water outlets connect, a water outlet extending from the heater casing, a connection between said latter outlet and the boiler at its top, said casing provided on its interior with a chamber, a tubular open ended shell within said casing, with its outer wall spaced from the casing chamber wall, affording a water passage around the shell, electric heating elements carried by the shell and sealed from contact with the water passing therethrough, and a plurality of heat conducting veins associated with the outer and inner peripheries of the shell wall and with which the water passing through said shell contacts.

In testimony whereof I have signed my name to this specification.

AXEL JOHNSON.